(12) United States Patent
Lee (10) Patent No.: US 6,772,985 B2
(45) Date of Patent: Aug. 10, 2004

(54) SEAT RAIL LOCKING SYSTEM FOR VEHICLE

(75) Inventor: Won Young Lee, Kyungsangbuk-Do (KR)

(73) Assignee: Daebu Machinery Co., Ltd., Kyungsangbuk-Do (KR)

( * ) Notice: Subject to any disclaimer, the term of this patent is extended or adjusted under 35 U.S.C. 154(b) by 0 days.

(21) Appl. No.: 10/247,833

(22) Filed: Sep. 20, 2002

(65) Prior Publication Data

US 2003/0085330 A1 May 8, 2003

(30) Foreign Application Priority Data

Nov. 8, 2001 (KR) .......................................... 2001-69364

(51) Int. Cl.[7] .............................................. F16M 13/00
(52) U.S. Cl. ...................... 248/424; 248/429; 248/430; 297/341; 296/65.14
(58) Field of Search ............................... 248/424, 429, 248/430; 297/341, 344.11, 344.1; 296/65.01, 65.13, 65.14, 65.15

(56) References Cited

U.S. PATENT DOCUMENTS

| | | | | |
|---|---|---|---|---|
| 4,291,856 A | * | 9/1981 | Urai | 248/429 |
| 4,478,383 A | * | 10/1984 | Urai | 248/429 |
| 4,621,867 A | * | 11/1986 | Perring et al. | 297/341 |
| 4,804,229 A | * | 2/1989 | Nishino | 297/471 |
| 4,951,966 A | * | 8/1990 | Nihei | 280/807 |
| 5,172,882 A | * | 12/1992 | Nini | 248/430 |
| 5,520,362 A | * | 5/1996 | Gerlach | 248/429 |
| 5,688,026 A | * | 11/1997 | Reubeuze et al. | 297/341 |
| 5,785,292 A | * | 7/1998 | Muraishi et al. | 248/429 |
| 5,800,015 A | * | 9/1998 | Tsuchiya et al. | 297/331 |
| 5,961,088 A | * | 10/1999 | Chabanne et al. | 248/429 |
| 6,059,345 A | * | 5/2000 | Yokota | 296/65.14 |
| 6,102,478 A | * | 8/2000 | Christopher | 297/341 |
| 6,109,584 A | * | 8/2000 | Garrido | 248/429 |
| 6,250,704 B1 | * | 6/2001 | Garrido | 296/65.05 |
| 6,264,159 B1 | * | 7/2001 | Su | 248/430 |
| 6,322,036 B1 | * | 11/2001 | Tame et al. | 248/429 |
| 2002/0060281 A1 | * | 5/2002 | Okazaki et al. | 248/424 |

FOREIGN PATENT DOCUMENTS

| | | | |
|---|---|---|---|
| JP | 55051627 A | * | 4/1980 |
| WO | WO 89/09707 A1 | * | 10/1989 |

* cited by examiner

*Primary Examiner*—Anita King
*Assistant Examiner*—Naschica S. Morrison
(74) *Attorney, Agent, or Firm*—Jacobson Holman PLLC (57) ABSTRACT

Disclosed is a seat rail locking system for a vehicle, installed in a seat rail assembly to permit forward and rearward movement of a seat and maintain the seat in a desired position. The seat rail assembly includes a lower rail which is fastened to a floor panel of a vehicle body, and an upper rail to which the seat is secured. The seat rail locking system comprises a locker guide fastened to the upper rail and defined at a bottom wall thereof with a guide hole; a locker received in a space defined between the upper rail and the locker guide and having an upper end which is connected to an operating lever and a lower end which is formed with locking projections to be moved upward and downward through the guide hole of the locker guide; a plurality of locking holes defined at a center portion of the lower rail to be spaced apart one from another by the same distance along a lengthwise direction of the lower rail, such that the locking projections can be engaged into selected ones of the locking holes; and a spring for biasing the locker in a direction where the locking projections of the locker are engaged into selected ones of the locking holes defined in the lower rail.

4 Claims, 12 Drawing Sheets

SEAT RAIL LOCKING SYSTEM FOR VEHICLE

BACKGROUND OF THE INVENTION

1. Field of the Invention

The present invention relates to a seat rail locking system for a vehicle, which is modified in its construction to control forward and rearward movement of an upper rail relative to a lower rail, with the upper and lower rails constituting a seat rail assembly, and to thereby ensure comfort of an occupant.

2. Description of the Related Art

Vehicle seats function to support occupants in a sitting position. Generally, vehicle seats are divided into a separation type seat which is used as a driver's seat and a front passenger seat to allow only one person to sit thereon and a bench type seat which is used as a rear passenger seat to allow several persons to sit thereon at the same time.

In the case of the separation type seat which is used as the driver's seat and the front passenger seat to allow only one person to sit thereon, a seat rail assembly is provided such that the seat is placed on the seat rail assembly. The seat rail assembly allows the seat to be slidingly moved forward and rearward depending upon a body figure of an occupant to thereby ensure riding comfort.

The seat rail assembly comprises an upper rail which is fastened to a floor panel of a vehicle body and a lower rail to which the seat is secured. In the seat rail assembly, the upper rail having secured thereto the seat can slide on the lower rail to be moved forward and rearward. In order to control movement of the upper rail on the lower rail, a seat rail locking system is provided.

Figure 11:
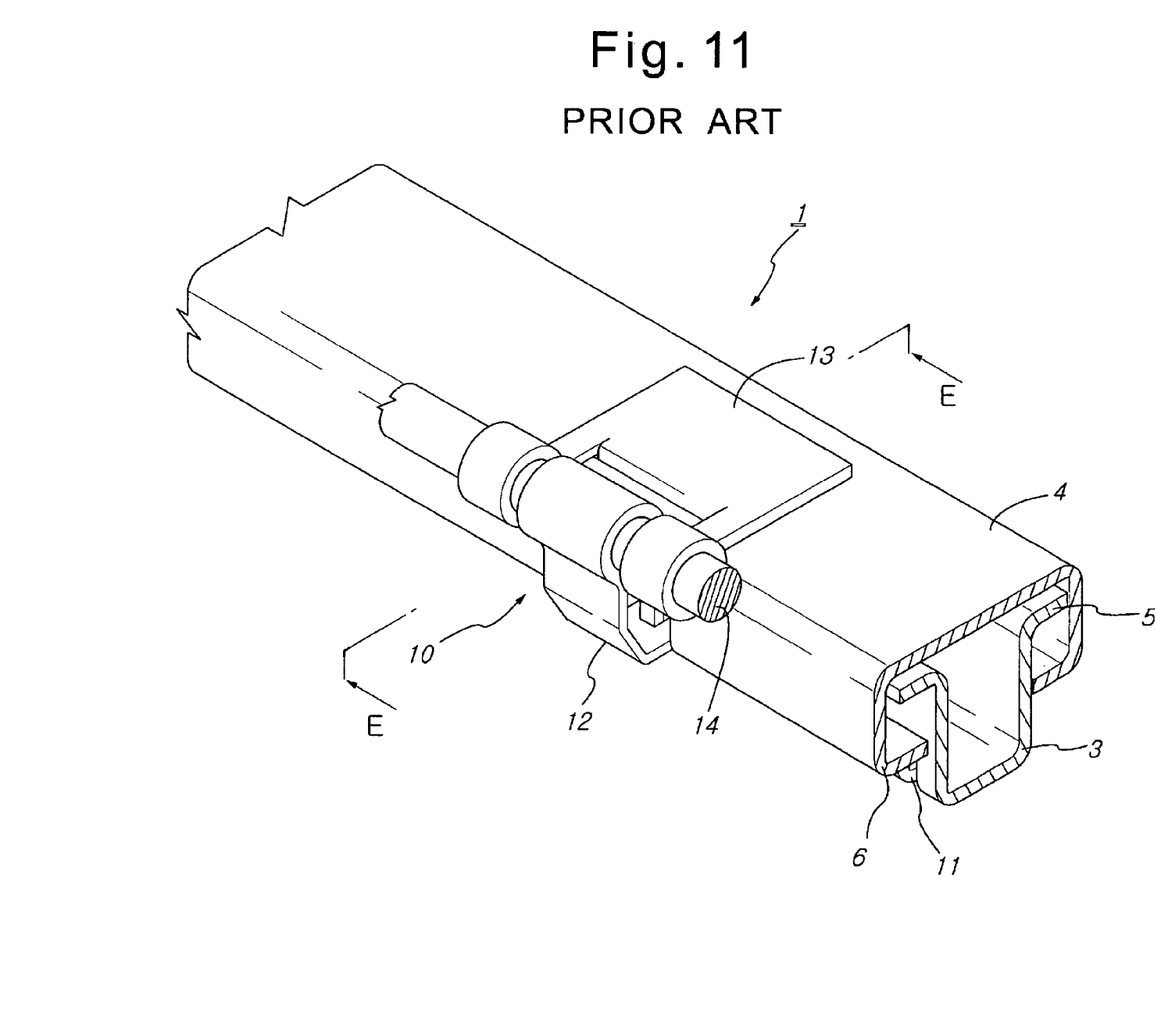
FIG. 11 is a partial perspective view illustrating a conventional seat rail locking system for a vehicle.
Figure 12:
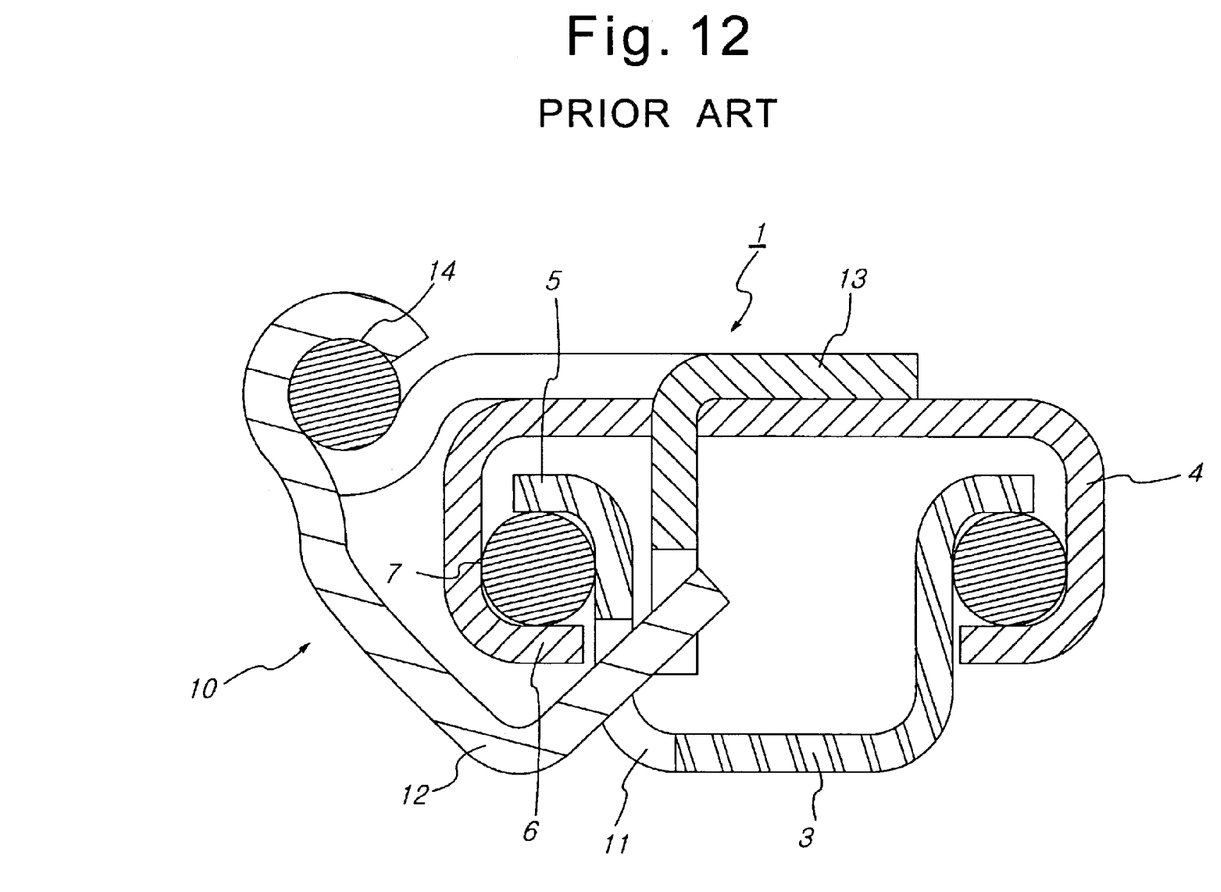
FIG. 12 is a cross-sectional view taken along the line E—E of FIG. 11.

Referring to FIGS. 11 and 12, a conventional seat rail assembly 1 comprises a lower rail 3 which is fastened to a floor panel of a vehicle body by the medium of fastening brackets, and an upper rail 4 which is operatively coupled with the lower rail 3 and to which a seat is secured.

Both widthwise ends of the lower and upper rails 3 and 4 are formed with outward and inward flanges 5 and 6, respectively. Balls 7 or a pair of ball seats or rollers having balls, serving as means for allowing the upper rail 4 to easily slide on the lower rail 3, are intervened between the outward and inward flanges 5 and 6.

Of course, the seat rail assembly 1 is provided with a seat rail locking system 10 which is configured to permit forward and rearward movement of the seat and maintain the seat in a desired position. The seat rail locking system 10 comprises a plurality of locking holes 11 which are defined in the lower rail 3 and a locker 12 which is provided to the upper rail 4. The locker 12 is fastened to a rod member 14. Due to the fact that the rod member 14 is rotatably supported by a locker guide plate 13 which is fastened to the upper rail 4 and a coil type spring (not shown) is wound around the rod member 14 to bias it in one rotating direction, the locker 12 is hingedly supported by the locker guide plate 13 by the medium of the rod member 14.

The conventional seat rail locking system 10 suffers from defects in that, since the locking system 10 is configured to project out of the seat rail assembly 1, an outer appearance of the seat rail assembly 1 is deteriorated. Also, as component elements of the locking system 10 have a substantial thickness and length so as to satisfy strength and durability required for the seat rail locking system 10, a weight of the seat rail assembly 1 cannot but be increased.

Specifically, after the seat rail assembly 1 is mounted to the vehicle body, in order to ensure that the seat rail assembly 1 is prevented from being damaged, deformed or unintentionally disassembled due to shock transferred to a vehicle while traveling on a road, since the lower and upper rails 3 and 4 must have a substantial thickness to reinforce strength of the seat rail assembly 1, a current trend of a vehicle toward light weight and reduced fuel consumption cannot be properly met.

Further, the seat rail locking system 10 is configured in a manner such that the plurality of locking holes 11 are defined in a bent portion of the lower rail 3 constituting the seat rail assembly 1 and the locker 12 is located at a side of the locking holes 11 to be rotatingly engaged into one of the locking holes 11 to thereby maintain the seat in a locked position. For this reason, in the process of operating the seat rail locking system 10 after mounting it to the seat rail assembly 1, a load is concentratedly applied to the seat rail assembly 1 at a region where the seat rail locking system 10 is mounted to the seat rail assembly 1. As a consequence, material fatigue is increased, and upon a head-on collision or a rear-end collision, the upper rail 4 is likely to be unintentionally separated from the lower rail 3 due to the presence of the seat rail locking system 10.

Moreover, since the lower rail 3 is bent in a state wherein the plurality of locking holes 11 are defined and therefore the lower rail 3 must be designed in consideration of after-bending deformation, problems are caused in that careful attention must be paid to tolerance over the entire seat rail locking system 10, and thereby a manufacturing cost of the seat rail locking system 10 is increased.

SUMMARY OF THE INVENTION

Accordingly, the present invention has been made in an effort to solve the problems occurring in the related art, and an object of the present invention is to provide a seat rail locking system for controlling movement of a vehicle seat, which is modified in its construction to be installed inside a seat rail assembly composed of upper and lower rails and not to be exposed to the outside, thereby improving an outer appearance of the seat rail assembly, and which has a simple configuration while ensuring operational reliability and improving durability, merchantability and productivity.

According to the present invention, there is provided a seat rail locking system for a vehicle, adapted for being installed in a seat rail assembly to permit forward and rearward movement of a seat and maintain the seat in a desired position, the seat rail assembly including a lower rail which is fastened at both ends thereof to a floor panel of a vehicle body by the medium of fastening brackets, an upper rail which is coupled with the lower rail and to which the seat is secured, both widthwise ends of the lower and upper rails being respectively formed with outward and inward flanges, and a pair of ball seats which have balls for allowing the upper rail to easily slide on the lower rail and are intervened between the outward and inward flanges, the seat rail locking system comprising: a locker guide fastened to the upper rail and defined at a bottom wall thereof with a guide hole; a locker received in a space defined between the upper rail and the locker guide and having an upper end which is connected to an operating lever and a lower end which is formed with locking projections to be moved upward and downward through the guide hole of the locker guide; a plurality of locking holes defined at a center portion of the lower rail to be spaced apart one from another by the same distance along a lengthwise direction of the lower rail, in a manner such that the locking projections can be engaged into selected ones of the locking holes; and a spring for biasing the locker in a direction where the locking projections of the locker are engaged into selected ones of the locking holes defined in the lower rail.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
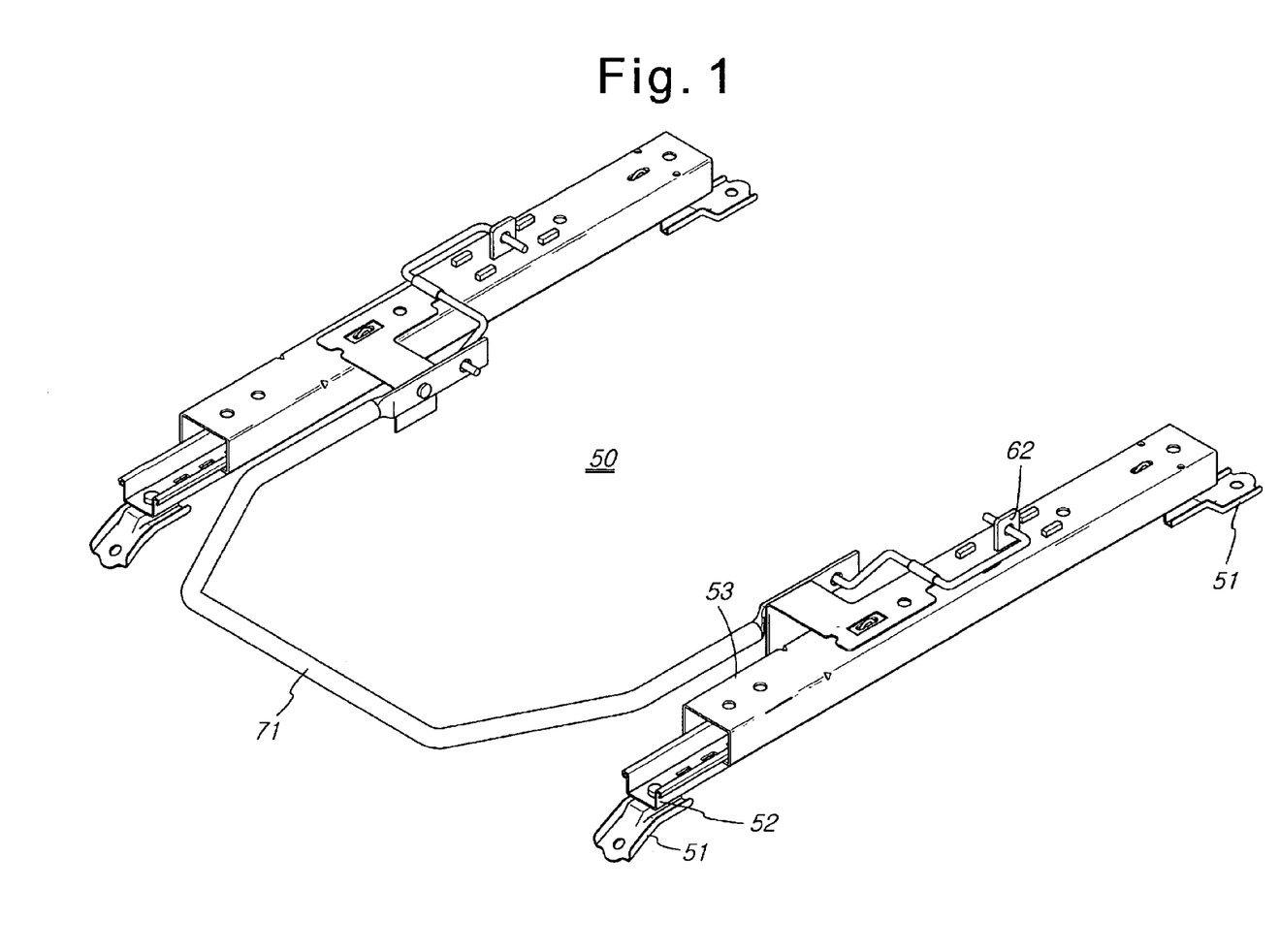
FIG. 1 is a perspective view illustrating a seat rail locking system for a vehicle in accordance with a first embodiment of the present invention.
Figure 2:
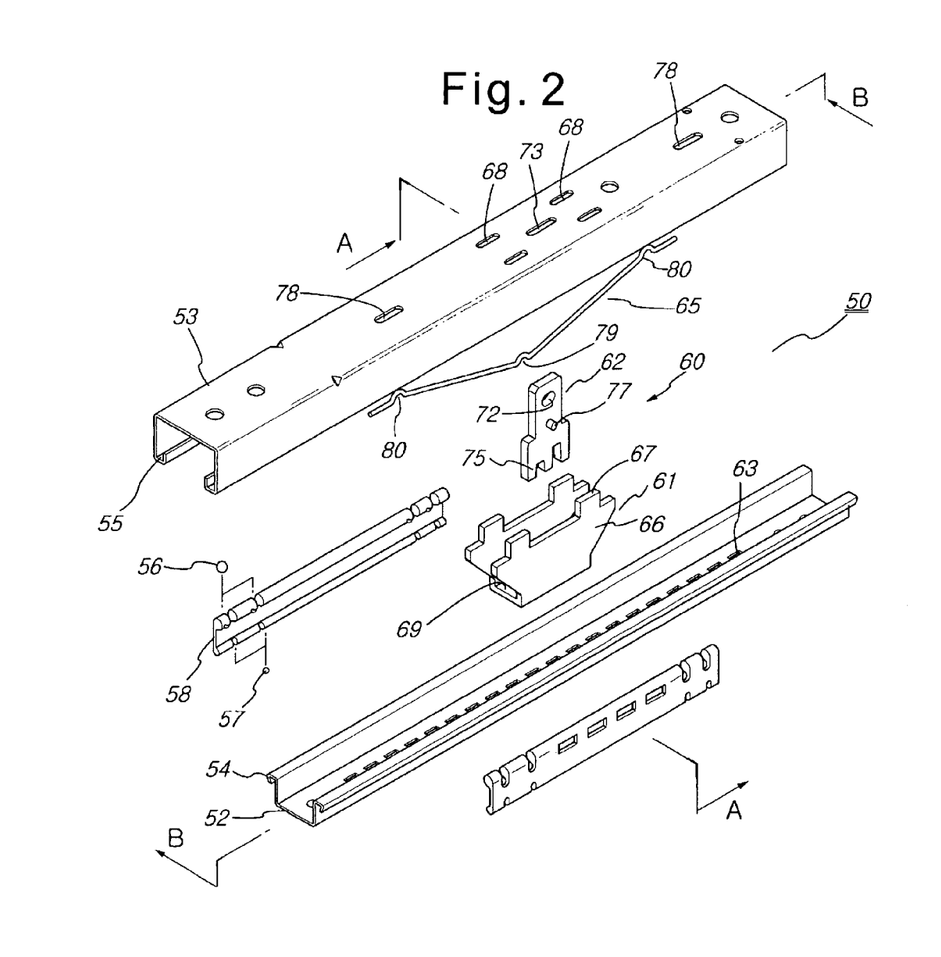
FIG. 2 is an exploded perspective view of the seat rail locking system shown in FIG. 1.

A seat rail locking system 60 for a vehicle according to the present invention is adapted for being installed in a seat rail assembly 50 to permit forward and rearward movement of a seat and maintain the seat in a desired position. The seat rail assembly 50 includes a lower rail 52 which is fastened at both ends thereof to a floor panel of a vehicle body by the medium of fastening brackets 51, and an upper rail 53 which is coupled with the lower rail 52 and to which the seat for allowing an occupant to sit thereon is secured.

Figure 3:
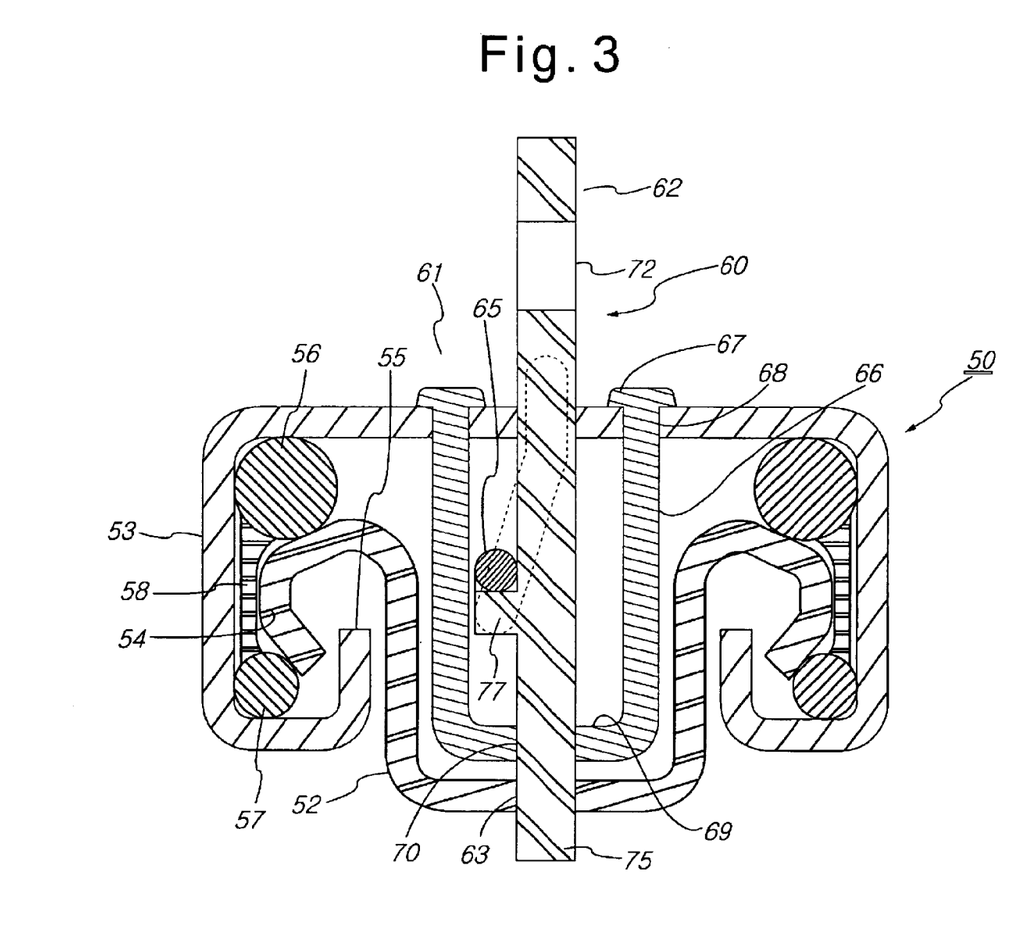
FIG. 3 is a cross-sectional view taken along the line A—A of FIG. 2.
Figure 4:
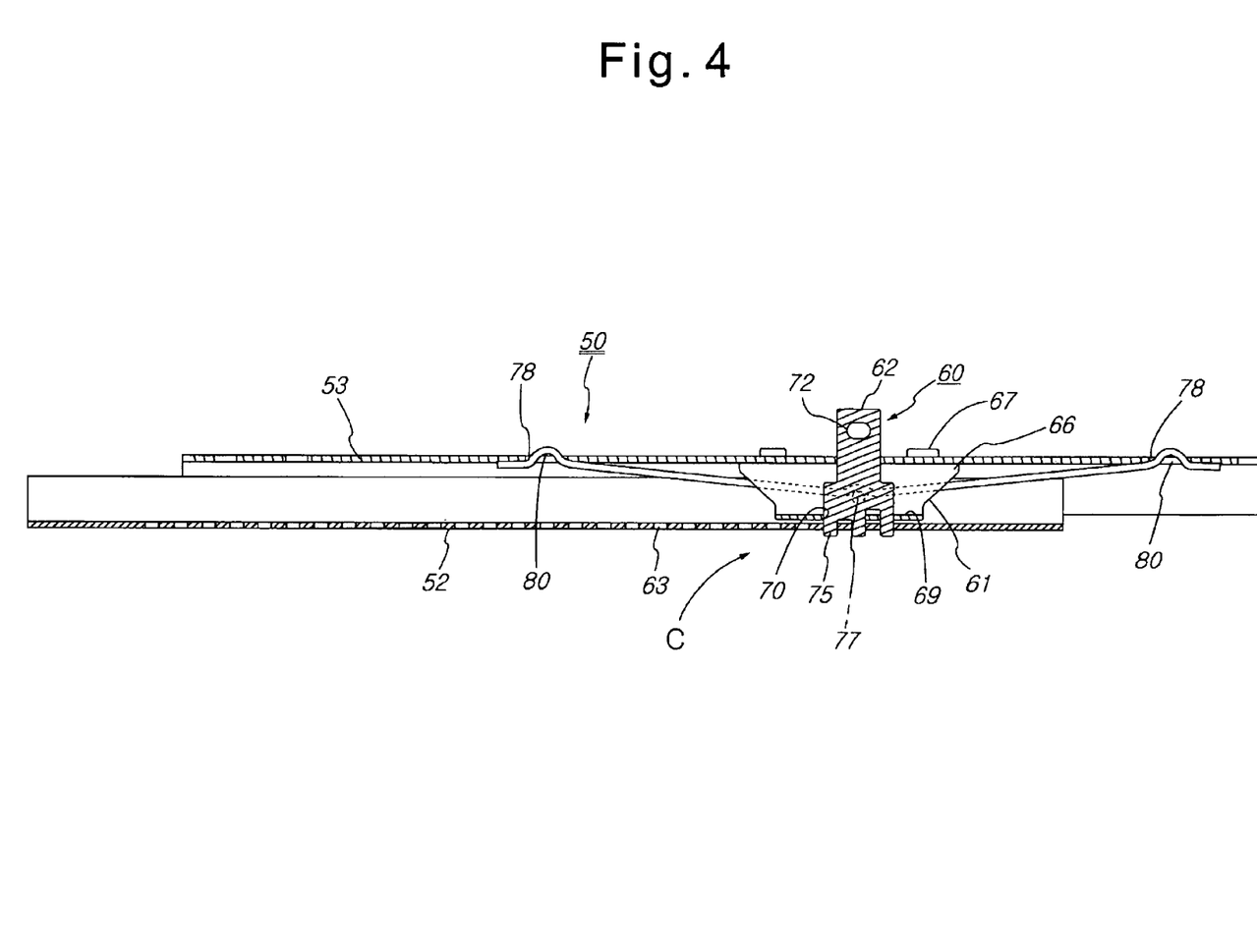
FIG. 4 is a cross-sectional view taken along the line B—B of FIG. 2.

Both widthwise ends of the lower and upper rails 52 and 53 are respectively formed with outward and inward flanges 54 and 55. The outward and inward flanges 54 and 55 respectively have inverted U-shaped and U-shaped sections.

Figure 5:
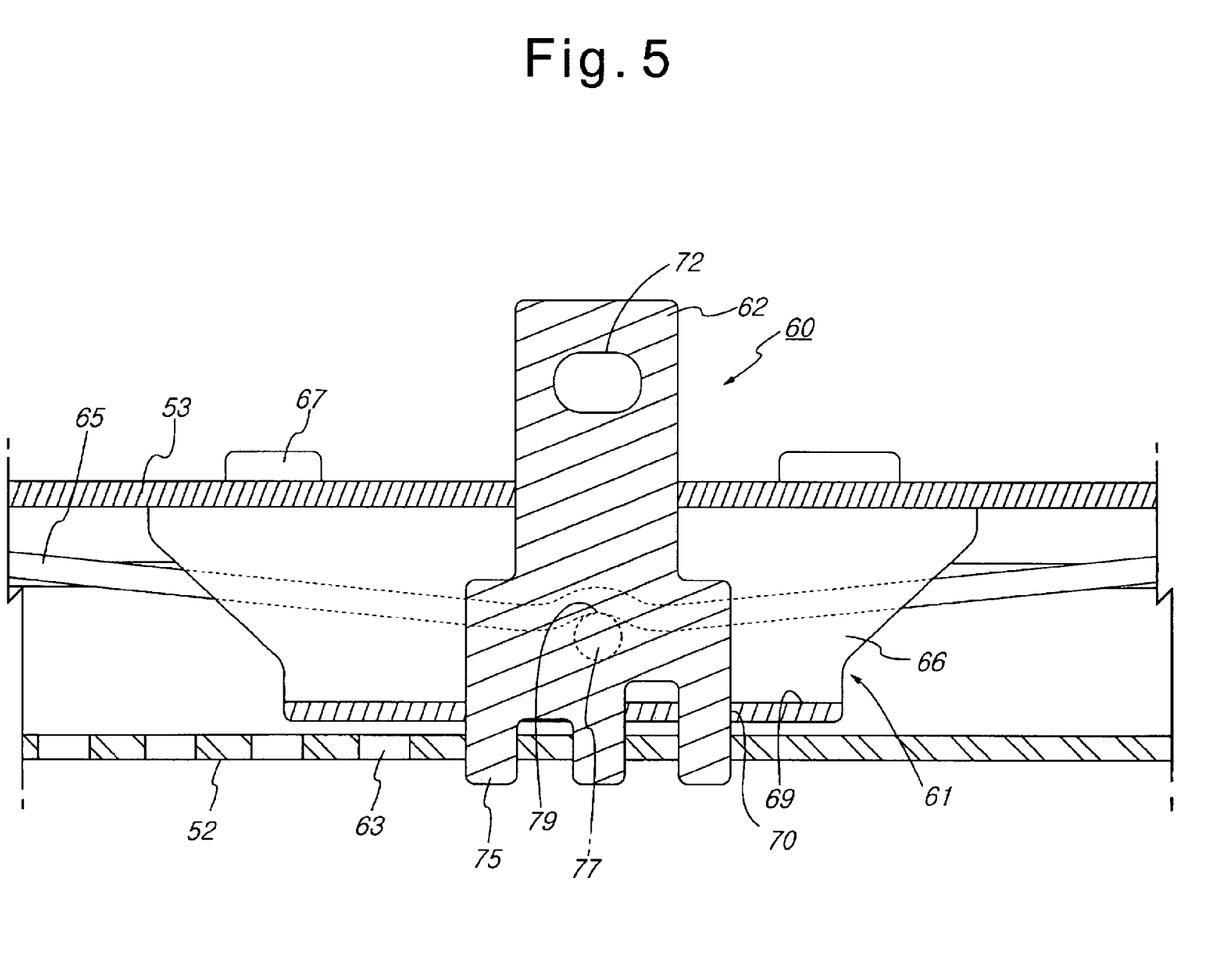
FIG. 5 is an enlarged view for the 'C' part of FIG. 4.

A pair of ball seats 58, each of which has at upper and lower ends thereof balls 56 and 57 serving as means for allowing the upper rail 53 to easily slide on the lower rail 52, are intervened between the outward and inward flanges 54 and 55.

The seat rail locking system 60 in accordance with a first embodiment of the present invention comprises a locker guide 61 which is fastened to the upper rail 53 and placed between the lower and upper rails 52 and 53, a locker 62 which is received in a space defined between the upper rail 53 and the locker guide 61, a plurality of locking holes 63 which are defined at a center portion of the lower rail 52 to be spaced apart one from another by the same distance along a lengthwise direction of the lower rail 52, and a spring 65 which biases the locker 62 in a direction where the locker 62 is engaged into selected ones of the locking holes 63 defined in the lower rail 52.

The locker guide 61 has a body part 66 which is bent to have a substantially U-shaped section to thereby receive the locker 62 therein.

Each leg portion of the body part 66 is formed, on an upper end surface thereof, with a pair of fastening projections 67. The locker guide 61 is fastened to the upper rail 53 in a manner such that two pairs of fastening projections 67 are respectively inserted through fastening holes 68 which are defined through the upper rail 53. The body part 66 of the locker guide 61 is defined at a bottom wall thereof with a guide hole 70 in a manner such that a lower end of the locker 62 can be moved upward and downward through the guide hole 70 to be engaged into and disengaged from selected ones of the locking holes 63 defined in the lower rail 52.

The locker 62 is defined, adjacent to an upper end thereof, with a connection hole 72 in a manner such that an operating lever 71 extending toward a front end of the seat rail assembly 50 is connected to the locker 62 by being fitted into the connection hole 72 in a state wherein an upper portion of the locker 62 projects upward through an opening 73 which is defined in the upper rail 53.

The lower end of the locker 62 is formed with locking projections 75 which can be engaged into selected ones of the locking holes 63 defined in the lower rail 52 after passing through the guide hole 70 of the locker guide 61, to restrain sliding movement of the upper rail 53 relative to the lower rail 52.

A middle portion of the locker 62 is formed with a spring pin 77. The spring pin 77 integrally projects from a side surface of the locker 62 to receive elastic force of the spring 65.

The spring 65 is formed in the shape of an elongate bar both halves of which are inclined upward when viewed from a middle portion of the spring 65. The middle portion and both ends of the spring 65 are formed with semicircularly curved portions 79 and 80, respectively. The curved portion 79 rests on the spring pin 77 of the locker 62, and the pair of curved portions 80 are respectively fitted into fitting holes 78 defined through the upper rail 53.

A seat rail locking system 60 for a vehicle in accordance with a second embodiment of the present invention will be described below with reference to FIGS. 6 through 10. Because the seat rail locking system 60 according to this second embodiment of the present invention is compatible with various kinds of vehicles such as a sedan, a coupe, and the like, expenses and labor required for developing and designing corresponding seat rail locking systems can be saved, and durability and quality of the seat rail locking system 60 can be improved.

Figure 6:
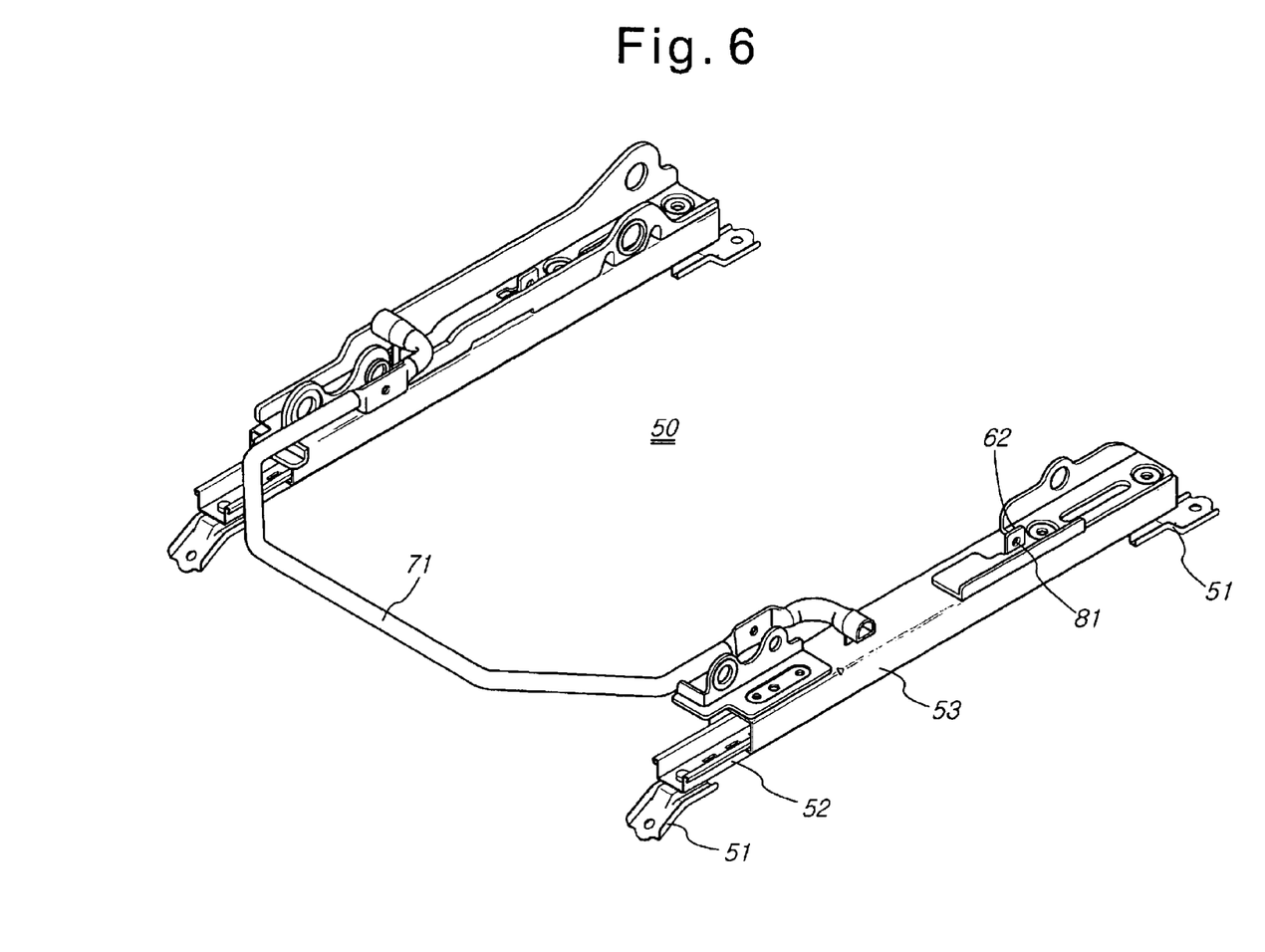
FIG. 6 is a perspective view illustrating a seat rail locking system for a vehicle in accordance with a second embodiment of the present invention.
Figure 7:
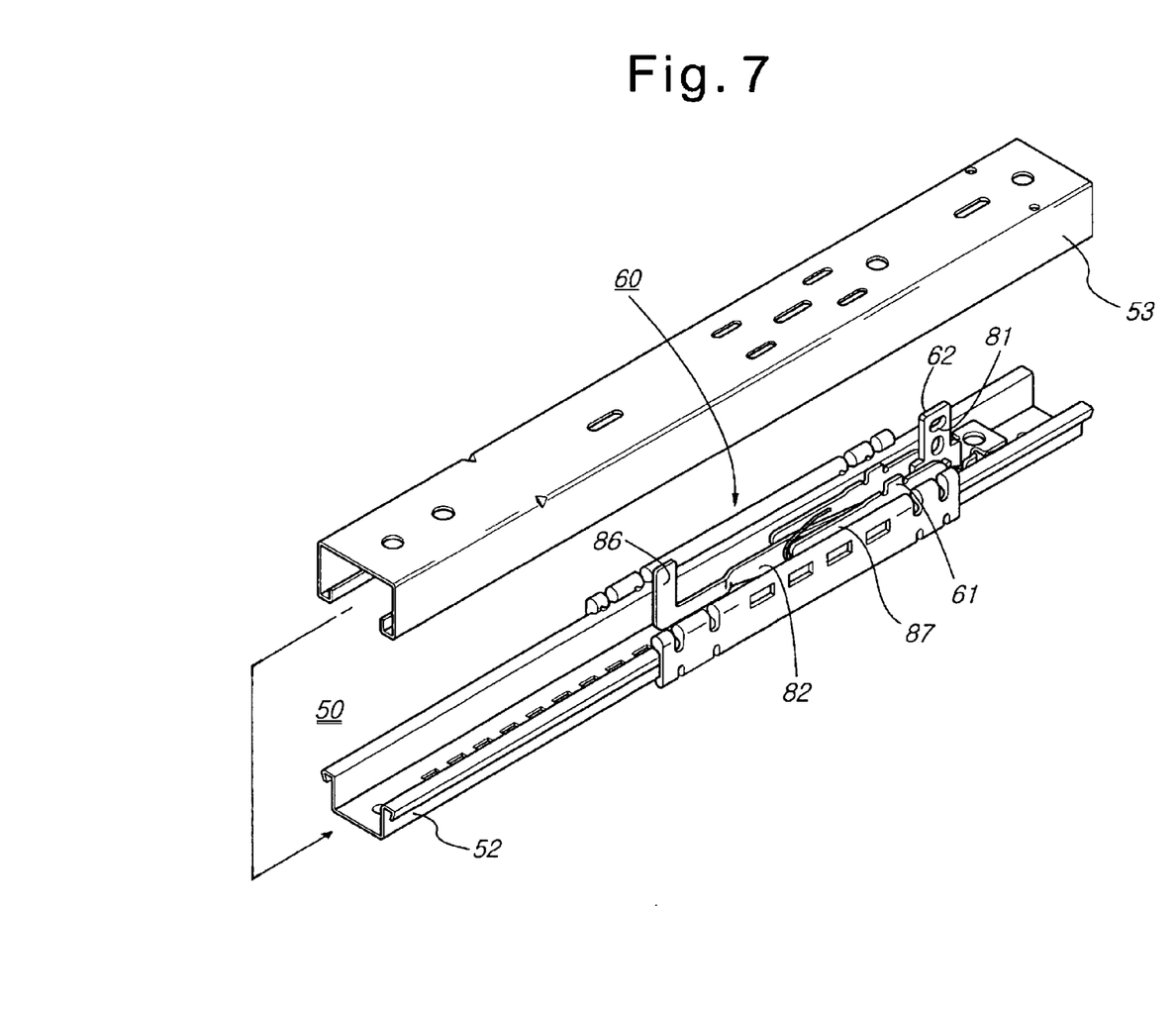
FIG. 7 is a perspective view illustrating a state wherein an upper rail is separated from a lower rail in the seat rail locking system shown in FIG. 6.
Figure 8:
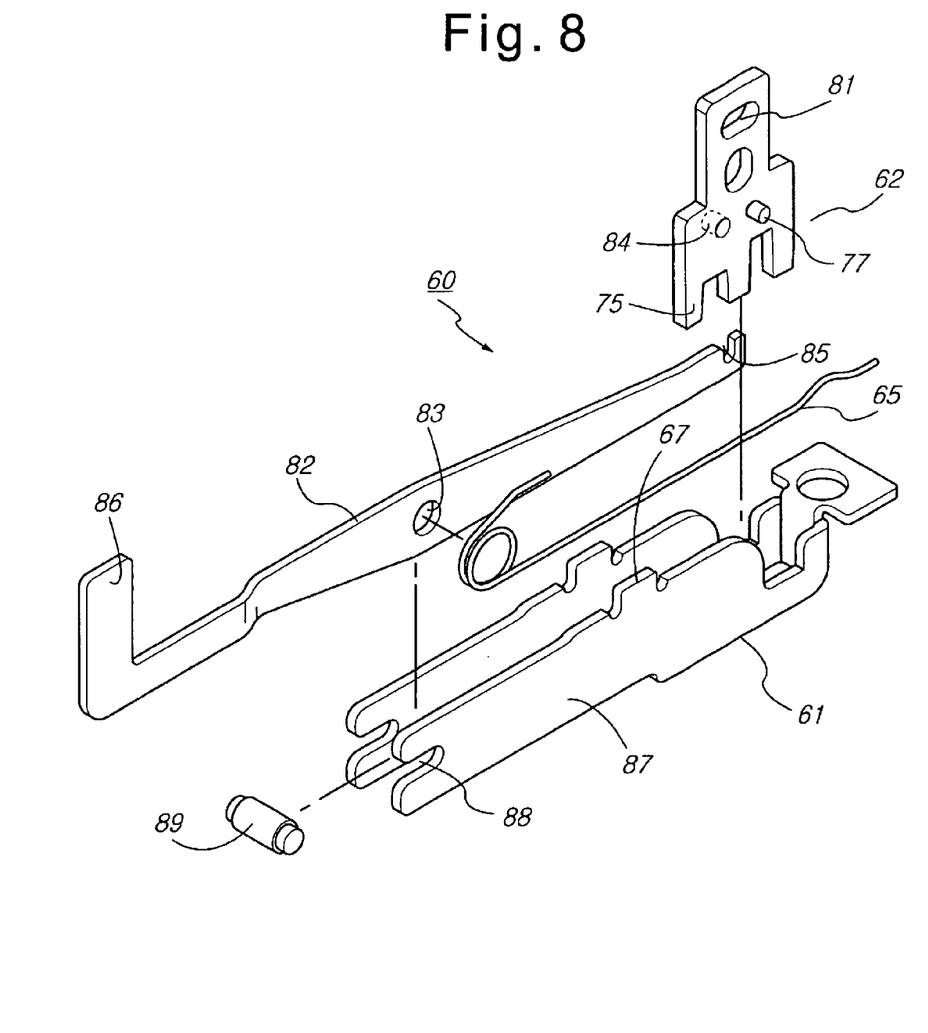
FIG. 8 is an exploded perspective view illustrating a main operating section of the seat rail locking system shown in FIG. 6.

To this end, the seat rail locking system 60 further comprises a locker lever 82 which is connected to the operating lever 71, instead of the upper end of the locker 62 being connected to the operating lever 71, to allow the seat rail locking system 60 to be operated in front of the seat. The upper end of the locker 62 received in the space defined between the upper rail 53 and the locker guide 61 is defined with a connection hole 81. A separate lever is connected to the locker 62 by being fitted into the connection hole 81 to allow the seat rail locking system 60 to be operated at the back of the seat.

The locker lever 82 is formed in the shape of an elongate plate which is defined at a middle portion thereof with a fixing hole 83. A rear end of the locker lever 82 is defined with a groove 85 which is opened at an upper end thereof and into which a lever pin 84 formed on the locker 62 can be inserted to be supported by the locker lever 82.

A front end of the locker lever 82 is formed with a connection arm 86 which extends upward through the upper rail 53 to be connected to the operating lever 71.

A front end of the locker guide 61 is formed with a pair of forwardly extending bridge portions 87 each of which is defined with a pin groove 88, and a pin 89 is inserted into pin grooves 88 of the bridge portions 87 and fitted through the fixing hole 83 of the locker lever 82 in a manner such that a torsion spring 65 is wound around the pin 89.

Figure 9:
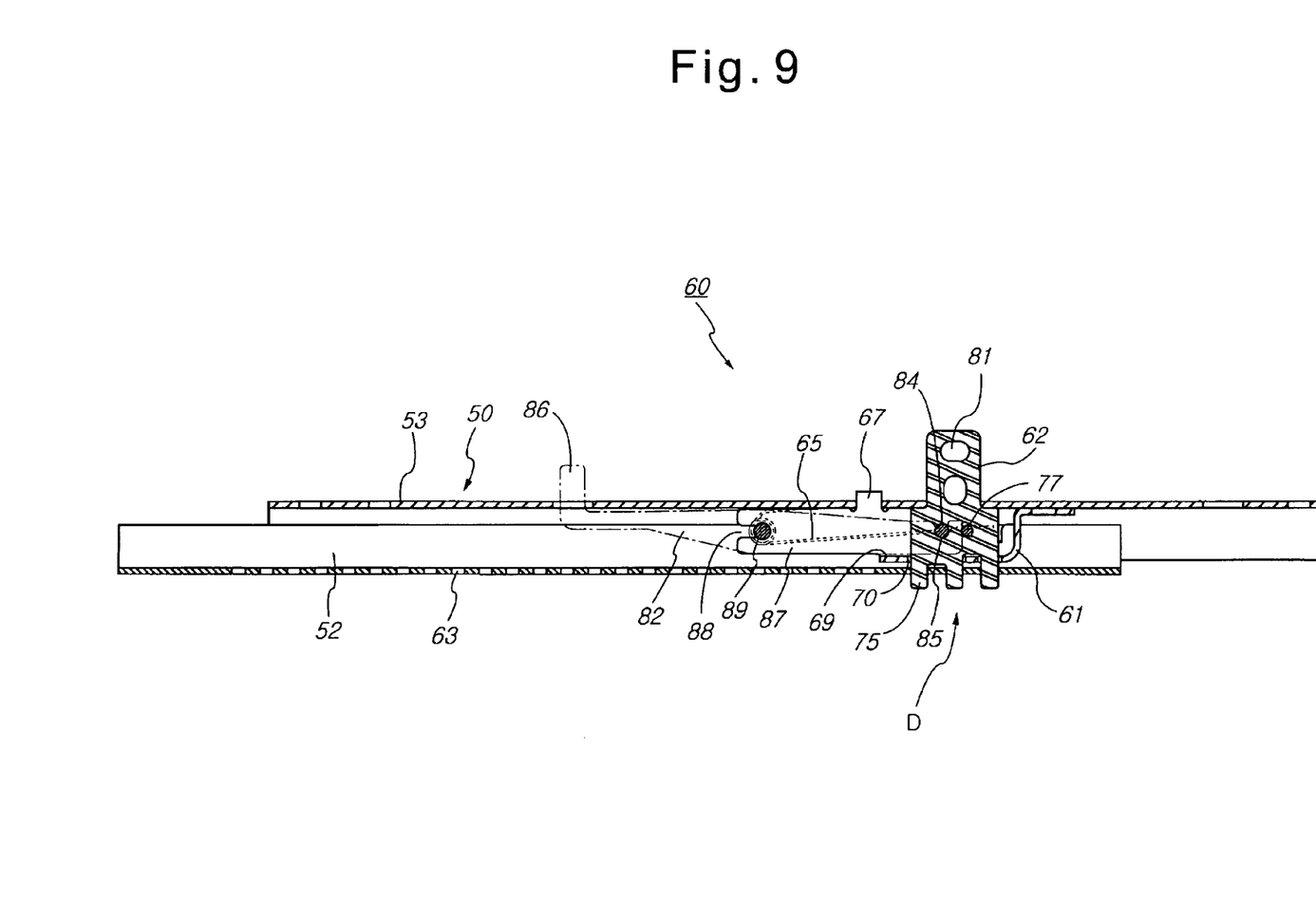
FIG. 9 is a cross-sectional view illustrating an assembled state of the seat rail locking system shown in FIG. 6.
Figure 10:
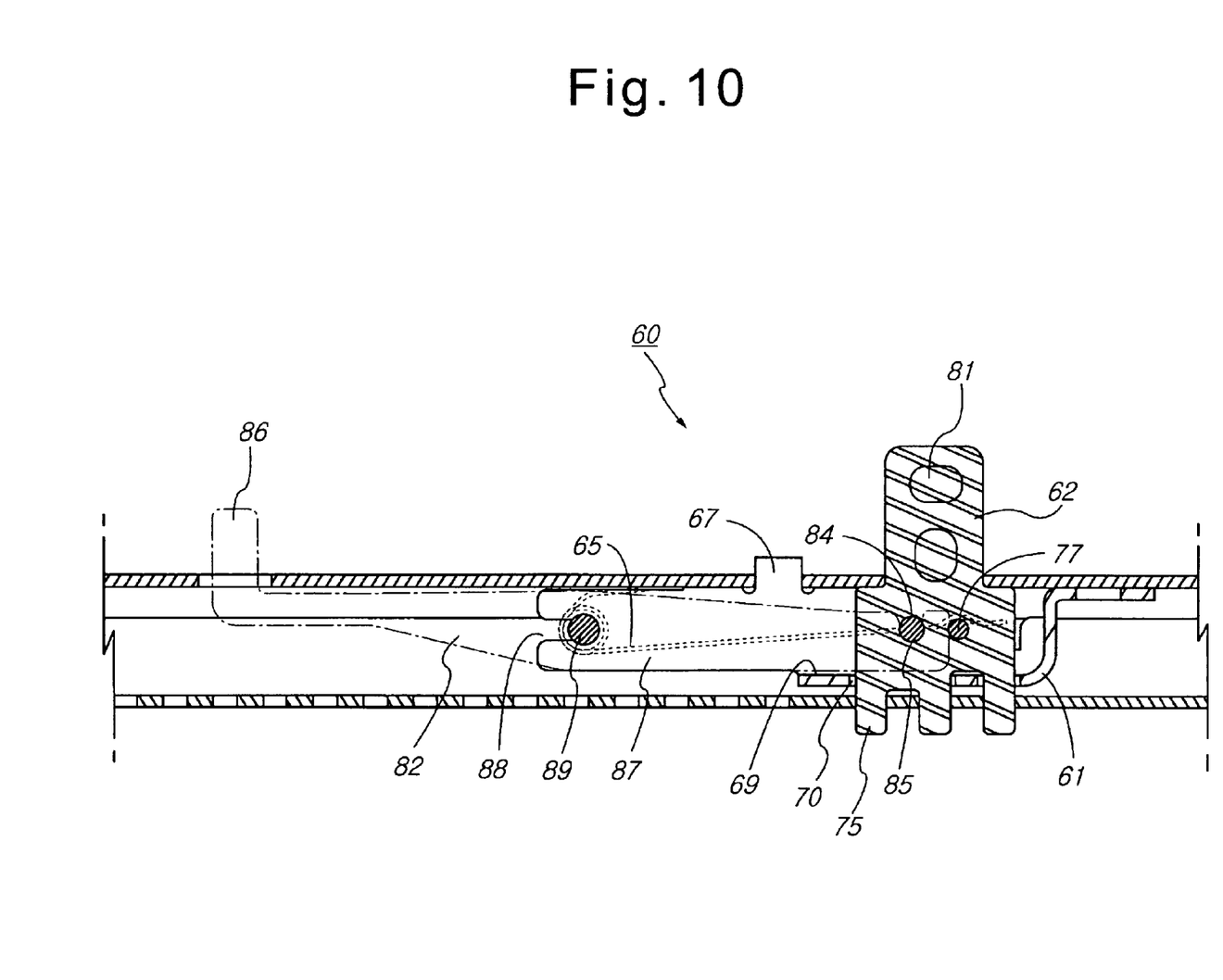
FIG. 10 is an enlarged view for the 'D' part of FIG. 9.

The torsion spring 65 has a short arm which rests on a lower surface of the upper rail 53 and a long arm which rests on the spring pin 77 of the locker 62 to bias the locker 62 in the direction where the locking projections 75 of the locker 62 are engaged into selected ones of the locking holes 63 defined in the lower rail 52.

Hereafter, operations of the seat rail locking system 60 according to the present invention, constructed as mentioned above, will be described.

First, in the case of the first embodiment, in an initial state, the locking projections 75 formed at the lower end of the locker 62, which is received in the space defined between the upper rail 53 and the locker guide 61, are biased by elastic force of the spring 65 to pass through the guide hole 70 of the locker guide 61 and be engaged into selected ones of the locking holes 63 which are defined at the center portion of the lower rail 52 to be spaced apart one from another by the same distance.

In this position, the upper rail 53 of the seat rail assembly 50 is prevented from being slidingly moved relative to the lower rail 52, and a rear end of the operating lever 71 extending toward the front end of the seat rail assembly 50 is connected to the locker lever 62 by being fitted into the connection hole 72 in a state wherein the upper portion of the locker 62 projects upward through the opening 73 defined in the upper rail 53.

If it is necessary to slidingly move the upper rail 53 relative to the lower rail 52 to thereby change a sitting position of an occupant, by pulling upward the operating lever 71 projecting forward of the front end of the seat rail assembly 50, the seat can be moved forward or rearward.

When the operating lever 71 is pulled upward, the locker 62 having its upper portion, which projects upward through the upper rail 53 and is connected with the operating lever 71, is lifted while overcoming elastic force of the spring 65.

As the locker 62 is lifted, the locking projections 75 formed at the lower end of the locker 62 are disengaged from the selected ones of the locking holes 63 defined in the lower rail 52, and thereby, the upper rail 53 can slide on the lower rail 52 to forwardly or rearwardly move the seat to a desired position.

When the seat is moved to the desired position, by releasing the operating lever 71, the locker 62 is lowered by elastic force of the spring 65.

As the locker 62 is lowered, the locking projections 75 formed at the lower end of the locker 62 pass through the guide hole 70 of the locker guide 61 and are engaged into newly selected ones of the locking holes 63 defined in the lower rail 52 to restrain sliding movement of the upper rail 53 in the same manner as the initial state.

Second, in the case of the second embodiment, in an initial state, the locking projections 75 formed at the lower end of the locker 62, which is received in the space defined between the upper rail 53 and the locker guide 61, are biased by elastic force of the spring 65 to pass through the guide hole 70 of the locker guide 61 and be engaged into selected ones of the locking holes 63 which are defined at the center portion of the lower rail 52 to be spaced apart one from another by the same distance.

In this position, the upper rail 53 of the seat rail assembly 50 is prevented from being slidingly moved relative to the lower rail 52.

If it is necessary to slidingly move the upper rail 53 relative to the lower rail 52 to thereby change a sitting position of an occupant, by pulling upward the operating lever 71 projecting forward of the front end of the seat rail assembly 50, the seat can be moved forward or rearward.

When the operating lever 71 is pulled upward, the locker lever 82 having its upper portion, which projects upward through the upper rail 53 and is connected with the operating lever 71, executes seesaw-like movement about the pin 89 which is inserted into the pin grooves 88 defined in the bridge portions 87 of the locker guide 61. By this fact, the locker lever 82 lifts the locker 62 while overcoming the elastic force of the torsion spring 65.

As the locker 62 is lifted, the locking projections 75 formed at the lower end of the locker 62 are disengaged from the selected ones of the locking holes 63 defined in the lower rail 52, and thereby, the upper rail 53 can slide on the lower rail 52 to forwardly or rearwardly move the seat to a desired position.

When the seat is moved to the desired position, by releasing the operating lever 71, the locker 62 is lowered by the elastic force of the spring 65.

As the locker 62 is lowered, the locking projections 75 formed at the lower end of the locker 62 pass through the guide hole 70 of the locker guide 61 and are engaged into newly selected ones of the locking holes 63 defined in the lower rail 52 to restrain sliding movement of the upper rail 53 in the same manner as the initial state.

When it is necessary to move the seat forward to get into or out of a rear seat, by connecting a separate lever or cable to the locker 62 in the connection hole 81 and operating the separate lever or cable, sliding movement of the upper rail 53 relative to the lower rail 52 can be easily controlled at the back of the seat.

That is to say, if the separate lever is operated, as the locker 62 is lifted and the locking projections 75 of the locker 62 are disengaged from the selected ones of the locking holes 63 defined in the lower rail 52, the seat can be moved forward.

When the locker 62 is lifted, only the torsion spring 65 is tensioned and the locker lever 82 is not influenced. In detail, since the upper end of the groove 85 defined in the locker lever 82 is opened and the lever pin 84 is inserted into the groove 85 in a vertical downward direction, the locker lever 82 is not influenced when the locker 62 is moved upward.

In the present invention, due to the fact that the seat rail locking system 60 is not exposed out of the seat rail assembly, an outer appearance of the seat rail assembly is improved, and in distribution, end products of the seat rail assembly can be neatly arranged in order. Also, by the fact that the seat rail locking system 60 is positioned in a balanced state between the lower and upper rails 52 and 53, it is possible to secure operational stability of the seat rail locking system 60.

In particular, the seat rail locking system 60 is compatible with various kinds of vehicles in that it is configured to be operated both in front of and at the back of the seat. Also, the seat rail locking system 60 is decreased in its volume and weight. Therefore, a manufacturing cost is reduced, the number of processes is decreased, running performance of the vehicle is improved, and fuel consumption is diminished.

As apparent from the above description, the seat rail locking system for a vehicle according to the present invention provides advantages in that, since the seat rail locking system for controlling movement of a vehicle seat is modified in its construction to be installed inside a seat rail assembly composed of upper and lower rails and not to be exposed to the outside, an outer appearance of the seat rail assembly is improved. Also, the seat rail locking system according to the present invention has a simple configuration while ensuring operational reliability and improving durability, merchantability and productivity.

Further, because the seat rail locking system is compatible with various kinds of vehicles, expenses and labor required for developing and designing corresponding seat rail locking systems can be saved, and durability and quality of the seat rail locking system can be improved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A seat rail locking system for a vehicle, adapted for being installed in a seta rail assembly to permit forward and rearward movement of a seat and maintain the seat in a desired position, the seat rail assembly including a lower rail which is fastened at both ends thereof to a floor panel of a vehicle body by the medium of fastening brackets, an upper rail which is coupled with the lower rail and to which the seat is secured, both widthwise and ends of the lower and upper rails being respectively formed with outward and inward flanges, and a pair of ball seats which have balls for allowing the upper rail to easily slide on the lower rail and are intervened between the outward and inward flanges, the seat rail locking system comprising:

a locker guide fastened to the upper rail and defined at a bottom wall thereof with a guide hole;

a locker received in a space defined between the upper rail and the locker guide and having an upper end which is connected to an operating lever and a lower end which is formed with locking projections to be moved upward and downward through the guide hole of the locker guide;

a plurality of locking holes defined at a center portion of the lower rail to be spaced apart one from another by the same distance along a lengthwise direction of the lower rail, in a manner such that the locking projections can be engaged into selected ones of the locking holes; and a spring for biasing the locker in a direction where the locking projections of the locker are engaged into selected ones of the locking holes defined in the lower rail, wherein the seat rail locking system further comprises a locker lever which is connected to the operating lever, instead of the upper end of the locker being connected to the operating lever, to allow the seat rail locking system to be operated in front of the seat; the upper end of the locker is defined with a connection hole; the locker lever is formed in the shape of an elongate plate which is defined at a middle portion thereof with a fixing hole; one end of the locker lever is defined with a groove into which a lever pin formed on the locker can be inserted; the other end of the locker lever is formed with a connection arm which extends upward through the upper rail to be connected to the operating lever; a front end of the locker guide is formed with a pair of forwardly extending bridge portions each of which is defined with a pin groove; and a pin is inserted into pin grooves of the bridge portions and fitted through the fixing hole of the locker lever in a manner such that the spring is wound around the pin.

2. The seat rail locking system as set forth in claim 1, wherein the spring comprises a torsion spring having one end which rests on a lower surface of the upper rail and the other end which rests on a spring pin of the locker to bias the locker in a direction where the locking projections of the locker are engaged into selected ones of the locking holes defined in the lower rail.

3. A seat rail locking system for a vehicle, adapted for being installed in a seta rail assembly to permit forward and rearward movement of a seat and maintain the seat in a desired position, the seat rail assembly including a lower rail which is fastened at both ends thereof to a floor panel of a vehicle body by the medium of fastening brackets, an upper rail which is coupled with the lower rail and to which the seat is secured, both widthwise and ends of the lower and upper rails being respectively formed with outward and inward flanges, and a pair of ball seats which have balls for allowing the upper rail to easily slide on the lower rail and are intervened between the outward and inward flanges, the seat rail locking system comprising:

a locker guide fastened to the upper rail and defined at a bottom wall thereof with a guide hole;

a locker received in a space defined between the upper rail and the locker guide and having an upper end which is connected to an operating lever and a lower end which is formed with locking projections to be moved upward and downward through the guide hole of the locker guide;

a plurality of locking holes defined at a center portion of the lower rail to be spaced apart one from another by the same distance along a lengthwise direction of the lower rail, in a manner such that the locking projections can be engaged into selected ones of the locking holes; and a spring for biasing the locker in a direction where the locking projections of the locker are engaged into selected ones of, the locking holes defined in the lower rail, wherein a middle portion of the locker is formed with a spring pin which integrally projects from a side surface of the locker to receive elastic force of the spring.

4. A seat rail locking system for a vehicle, adapted for being installed in a seta rail assembly to permit forward and rearward movement of a seat and maintain the seat in a desired position, the seat rail assembly including a lower rail which is fastened at both ends thereof to a floor panel of a vehicle body by the medium of fastening brackets, an upper rail which is coupled with the lower rail and to which the seat is secured, both widthwise and ends of the lower and upper rails being respectively formed with outward and inward flanges, and a pair of ball seats which have balls for allowing the upper rail to easily slide on the lower rail and are intervened between the outward and inward flanges, the seat rail locking system comprising:

a locker guide fastened to the upper rail and defined at a bottom wall thereof with a guide hole;

a locker received in a space defined between the upper rail and the locker guide and having an upper end which is connected to an operating lever and a lower end which is formed with locking projections to be moved upward and downward through the guide hole of the locker guide;

a plurality of locking holes defined at a center portion of the lower rail to be spaced apart one from another by the same distance along a lengthwise direction of the lower rail, in a manner such that the locking projections can be engaged into selected ones of the locking holes; and a spring for biasing the locker in a direction where the locking projections of the locker are engaged into selected ones of the locking holes defined in the lower rail, wherein the spring is formed in the shape of an elongate bar, both halves of which are inclined upward when viewed from a middle portion of the spring; and the middle portion and both ends of the spring are formed with semicircularly curved portions which respectively rest on a spring pin of the locker and are fitted into fitting holes defined through the upper rail.

* * * * *